United States Patent
Takahashi et al.

[11] Patent Number: 6,098,287
[45] Date of Patent: Aug. 8, 2000

[54] METHOD FOR MANUFACTURING A BALL JOINT

[75] Inventors: Kunihisa Takahashi; Noboru Yuki; Nobuyuki Maki; Yoshikazu Suga, all of Tokyo, Japan

[73] Assignee: THK Co., Ltd., Tokyo, Japan

[21] Appl. No.: 09/147,561

[22] PCT Filed: Jun. 6, 1997

[86] PCT No.: PCT/JP97/01930

§ 371 Date: Jan. 20, 1999

§ 102(e) Date: Jan. 20, 1999

[87] PCT Pub. No.: WO98/55774

PCT Pub. Date: Dec. 10, 1998

[51] Int. Cl.[7] .................................................. B21D 53/10
[52] U.S. Cl. ........................... 29/898.043; 29/898.053; 29/441.1
[58] Field of Search ...................... 29/898.043, 898.045, 29/898.13, 898.053, 898.049, 441.1

[56] References Cited

U.S. PATENT DOCUMENTS

| | | | |
|---|---|---|---|
| 5,070,609 | 12/1991 | Teramachi | 29/898.043 |
| 5,330,095 | 7/1994 | Krude et al. | 228/177 |
| 5,417,512 | 5/1995 | Chamberlin | 403/135 |

FOREIGN PATENT DOCUMENTS

| | | |
|---|---|---|
| 47-11002 | 4/1972 | Japan . |
| 53-64976 | 11/1976 | Japan . |
| 52-9272 | 3/1977 | Japan . |
| 53-8861 | 4/1978 | Japan . |
| 53-12655 | 5/1978 | Japan . |
| 57-7385 | 1/1982 | Japan . |
| 57-129962 | 8/1982 | Japan . |
| 58-173075 | 10/1983 | Japan . |
| 62-18768 | 4/1987 | Japan . |
| 5-77886 | 10/1993 | Japan . |
| 5-86484 | 12/1993 | Japan . |
| 9-189322 | 7/1997 | Japan . |

*Primary Examiner*—David P. Bryant
*Assistant Examiner*—Marc W. Butler
*Attorney, Agent, or Firm*—Arent Fox Kintner Plotkin & Kahn, PLLC

[57] ABSTRACT

This manufacturing method comprises a first step in which a molten aluminum alloy is cast into casting dies into which a ball 8 forming a ball portion 1a of a ball-shank 1 in corporation with a shank 1b connected to the portion 1a is inserted as a core so that a holder 2 covering the ball portion 1a is formed leaving the connected portion of the shank 1b as it is; a second step in which the aluminum alloy for forming the holder 2 is subjected to a solution heat treatment; a third step in which the shank 1b is brought into pressure contact with the ball 8 exposed from the holder 2, electrodes 10a and 10b are held in contact with the shank 1b and the holder 2, respectively, and the ball 8 and the shank 1b are projection-welded by turning on electricity between electrodes to thereby form the ball-shank 1; and a fourth step in which an external force is applied to the holder 2 or the ball-shank 1 to thereby provide a gap between the ball 8 and the holder 2.

10 Claims, 14 Drawing Sheets

F I G .7
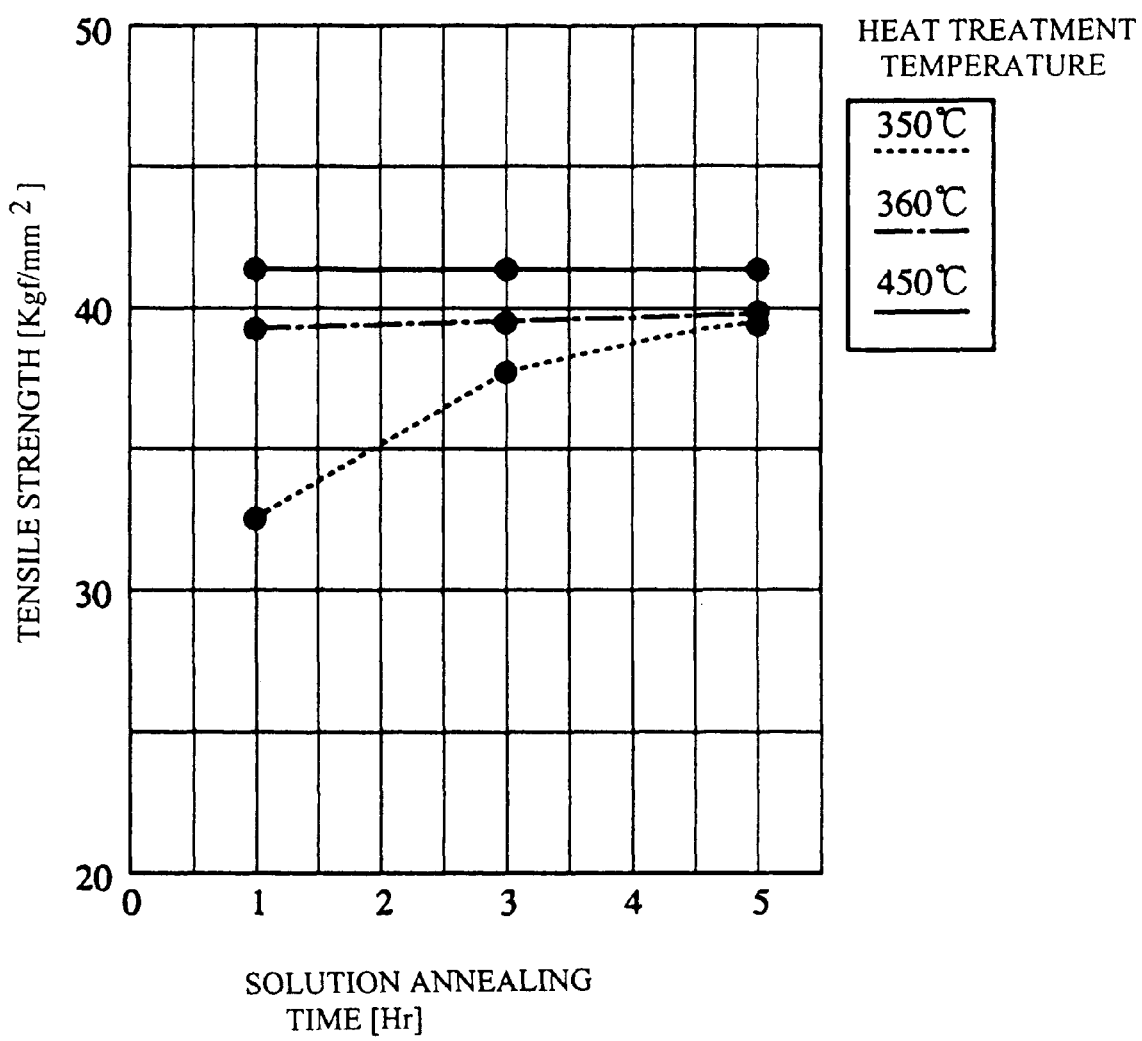

METHOD FOR MANUFACTURING A BALL JOINT

FIELD OF ART

The present invention relates to a method of manufacturing a ball joint for use with a link motion mechanism such as the suspension arm portion or steering portion of an automobile or the cutting blade driving portion of a combine.

BACKGROUND ART

Conventionally, as a method of manufacturing a ball joint of the above type, there has been known one that is disclosed in the Examined Published Japanese Patent Application No. 77886/1993.

As shown in FIG. 17, this method comprises a first step of forming a holder 102 by die-casting using dies 100 having a steel ball 101 inserted therebetween as a core (refer to exploded views a and b), a second step of forming a ball-shank 104 comprised of a shank 103 projection-welded to the steel ball 101 covered with the holder 102 (refer to exploded views c and d); and a third step of applying an external force to the ball-shank 104 or the holder 102 so that a minute gap is formed between the steel ball 101 and the holder 102 closely adhered to each other at the time of forging by the first step, and since the spherical surface of the steel ball 101 is transferred to the holder 102 at the time of casting the latter, a ball joint manufactured by such method as shown in FIG. 18 features that the steel ball 101 and the holder 102 come into sliding contact with each other without rattling thereby making a smooth rotational or oscillating motion.

Further, in the first step of the above-described manufacturing method, the steel ball 101 serving as a core at the time of casting the holder 102 is clamped from on both upper and lower sides thereof by closing the dies 100 in order to keep the steel ball 101 as a core between the dies 100 at the time of casting the holder 102 and the holder 102 is made to have openings 105 and 106 in correspondence to the upper and lower positions of the steel ball 101, respectively. And in the second step, a projection welding operation is performed by using the openings 105 and 106 such that the shank 103 and an electrode 107 for feeding a welding current are brought into contact with the spherical surface of the steel ball 101 through the openings 105 and 106, respectively, and under such condition, a projection welding operation is performed while feeding a predetermined amount of welding current between the steel ball 101 and the shank 103.

Now, where a projection welding operation is performed by bringing the electrode into direct contact with the steel ball according to the above-described conventional method, there is a fear that unless a sufficiently large area of contact between the steel ball and the electrode is secured, a welding resistance to the welding current generates between the electrode and the steel ball which results in melting the steel ball at the position at which the electrode is in contact with the steel ball. Therefore, it is necessary that the opening formed to allow the electrode to pass therethrough has some degree of wideness.

However, such opening for the electrode comes to become coaxial with the shank welded to the steel ball and if the opening is formed sufficiently large, the area of contact between the steel ball and the holder projected along the axis of the shank (refer to FIG. 18) can not but be small so that there has arisen a problem that the capacity of the shank to bear the load acting along the axis thereof, i.e., the axial load, becomes insufficient.

Further, there has also been a problem in order to increase the load-bearing capacity of the shank without reducing the diameter of the opening for the electrode, the diameter of the steel ball has to be made large and the resultant ball joint itself is made large-sized and heavy in weight accordingly.

On the other hand, even when the electrode-passage opening formed in the shank is sufficiently large, if the degree of contact of the electrode itself with respect to the steel ball is not favorable, a welding resistance still generates between the electrode and the steel ball resulting in melting the ball at the contact position of the electrode with the ball. Therefore, in the case of the above-described conventional manufacturing method, a copper plate electrode is formed to have a spherical surface after the example of the spherical surface of the ball but such arrangement has had the disadvantage that since the configuration of the electrode changes gradually while repeating the projection welding, it is necessary to reform the electrode every time when a predetermined number of welding operations is performed and so the production control becomes quite troublesome.

Further, the above-described conventional manufacturing method has had the problems that it mainly uses a zinc-based die-casting alloy (for example, a zinc-aluminum-copper type die-casting alloy) as a holder forming material but although such die-casting zinc alloy has an excellent degree of mechanical strength such as a tensile strength, hardness, tenacity and etc., since it lacks anti-corrosiveness and has a large specific gravity, the holder tends to become corroded and can not but become heavy in weight, the location of using a link mechanism formed by using a ball joint manufactured by the method is limited and the reduction of weight of the link mechanism is hindered.

On the other hand, there may be given an aluminum-based material as a die-casting alloy having a small specific gravity but such die-casting aluminum alloy in its state of being die-cast is inferior to the above-described die-casting zinc alloy with respect to its tensile strength and hardness and a ball joint manufactured by using this alloy can not be used at the structural portion of which a mechanical strength is required, for example, the portion like the tie rod at the suspension of an automobile.

DISCLOSURE OF THE INVENTION

The present invention has been made in view of the above-described problems and an object of the invention is to provide a method of manufacturing a ball joint which method can manufacture a ball joint having a high level of capacity to bear an axial load acting in the direction of axis of the shank irrespective of the smallness of the diameter of the ball and is easy of production control.

Another object of the present invention is to provide a method of manufacturing a ball joint which method is capable of forming a holder having an excellent mechanical strength by die-casting an aluminum alloy.

In order to achieve these objects, the present invention provides the following two methods of manufacturing ball joints.

That is, the first manufacturing method features that it is adapted to manufacture a ball joint having a holder and a ball-shank which are coupled to each other so as to oscillate or rotate freely and comprises a first step in which a molten electro-conductive alloy is cast into casting dies having a ball inserted therebetween to thereby casting a holder covering the ball leaving a shank connected portion as it is, a second step in which two electrodes are brought into contact with the shank and the holder, respectively, and a welding current is fed between the electrodes so that the ball and the shank are projection-welded to produce a ball-shank and a third step in which an external force is applied to the holder or the ball-shank to thereby form a gap between the ball and the holder.

According to such a method of the present invention, since, in its second step, the welding current is fed between the shank and the holder through the ball thereby projection-welding the two members without bringing the electrode into direct contact with the ball, it is not necessary to provide an opening in the holder through which the electrodes come into contact with the ball. Accordingly, in the first step of casting the holder, the ball can be covered with an electro-conductive alloy material leaving only the shank-bonded portion as it is so that it is possible to manufacture a ball joint having a high-level of capacity to bear an axial load acting on the shank.

Further, even when the welding current is fed between the shank and the holder through the ball, the holder cast by the first step is held in close contact with the ball and since it is only the shank connected portion where the ball is exposed from the holder, the ball and the holder have a sufficiently wide area of contact. Accordingly, almost no welding resistance to the welding current generates between the ball and the holder so that it is possible to connect only the shank and the ball by projection welding without allowing the ball to be welded to the holder.

In addition, according to such method of the present invention, the connected portion of the shank and the ball can be quenched immediately by re-feeding a current between the shank and the holder after the completion of the projection welding so that it is also possible to easily prevent the connected portion from cracking resulting from leaving the connected portion of the ball and the shank as they are after welding.

On the other hand, the second manufacturing method of the present invention features that it comprises a first step in which an aluminum alloy is cast into casting dies having a steel ball inserted therebetween as a core and a holder covering the steel ball is cast by die-casting, a second step in which the holder made of the aluminum alloy is subjected to a solution heat treatment and a third step in which an external force is applied to the steel ball or the holder to provide a gap between the steel ball and the holder so that the steel ball is made rotatable with respect to the holder.

According to the method of the present invention comprising the above-described steps, since the holder covering the steel ball is cast by die-casting the aluminum alloy in the first step and the holder is subjected to a solution heat treatment in the subsequent second step, the mechanical strength of the holder is remarkably improved due to an age hardening taking place over several hours after such processes. Accordingly, even when the holder is formed by die-casting the aluminum alloy which have been considered to be inferior to other materials in its mechanical strength, the mechanical strength required of the ball joint could be satisfied to a sufficient degree.

Now, where the function of a ball joint is taken into consideration, the steel ball used in the first step is required to have a anti-abrasion property and it is general that the surface of the ball is subjected in advance to quenching such as carbonic quenching. However, due to the fact that the temperature of the solution heat treatment of the aluminum alloy covering the steel ball in the first step is remarkably lower than the steel ball quenching temperature, when the holder is subjected to a solution heat treatment after die-casting, the same result as when the steel ball is tempered generates so that there is a fear that the surface of the steel ball hardened by quenching with much trouble will become softened and the sliding condition of the steel ball with respect to the holder will become worse in its early stages.

FIG. 16 is a graph showing a relationship between the tempering temperature and the hardness of a quenched steel ball (stainless steel/440° C.) when the steel ball is tempered. From this graph, it will be understood that when the tempering temperature exceeds 550° C., the hardness of the steel ball drops rapidly and the softening of the surface of the steel ball is accelerated. Accordingly, where a special steel such as a stainless steel is used as the above-described steel ball, if the solution heat treatment temperature for the holder is less than 550° C., it is possible to maintain the surface hardness of the steel ball at a practically safe level.

Further, from the points of view of production cost and universality, it is preferable to use, as the steel ball, a common steel subjected to a carbon-quenching process but in that case, the solution heat treatment temperature for the holder must be further lower than the above-described tempering temperature of the stainless steel ball. According to the confirmation of the present inventors, when the solution heat treatment temperature for the holder is lower than 450° C., it is possible to maintain the surface hardness of the steel ball at a practically safe level.

At the same time, in view of the fact that the solution heat treatment temperature differs depending on the composition of the aluminum alloy, in order to keep the solution heat treatment temperature within the above-described range, it is the composition of the aluminum alloy that matters. In this connection, it is considered that various kinds of aluminum alloys the solution heat treatment temperatures for which falls within the above-described range may be produced by preparing chemical elements to be added to the aluminum alloys and according to what has been confirmed by the present inventors, there exists an aluminum-zinc-silicon type die-casting aluminum alloy whose solution heat treatment temperature is in the order of 360–450° C. and which shows a mechanical strength exceeding that of a die-casting zinc alloy due to an age hardening. The concrete composition of such die-casting aluminum alloy will be described later.

Further, in the method of the present invention, a ball-shank may be formed in such a manner that after the completion of a solution heat treatment and quenching of a holder, a shank is projection-welded to a steel ball in the same manner as in the case of the conventional method. However, it is preferable that a welding current is indirectly fed to the steel ball according to the above-described first manufacturing method of the invention from the point of view of preventing the steel ball from getting injured because of the fact that the surface of the steel ball tends to become softened after the solution heat treatment of the holder as described above. With such an arrangement, the shank can be projection-welded to the steel ball without the necessity of pressing the electrode against the steel ball thereby forming the ball-shank without damaging the surface of the steel ball.

Further, the shank is not always required to be welded to the steel ball after die-casting the holder but the holder may be welded to the steel ball prior to the die-casting. In this case, only the ball portion of the ball-shank formed by projection welding is inserted between the casting dies and the holder is die-cast in that condition.

It should be noted that it is not always necessary to weld the shank to the steel ball used in the method of the present invention but if a holder is die-cast with a steel ball having a through hole, it will be possible to use a ball joint by the method of the present invention by inserting and fixing the rod or the like of a link mechanism into the through hole of the steel ball of such ball joint.

In addition, in the second step of the method of the present invention, since the holder to be subjected to a solution heat treatment has already covered the steel ball, if the holder is heated, the steel ball will also be heated so that there is a fear that the surface of the steel ball becomes remarkably coarse by oxidation and the intrinsic function of the ball joint of allowing the holder and the ball to come into smooth sliding contact with each other can not be displayed. Accordingly, from such point of view, it is preferable that the holder be subjected to a solution heat treatment in an oxygen-free environment so as to prevent the surface of the steel ball from becoming oxidized due to heating to thereby secure a smooth sliding motion between the holder and the steel ball.

BRIEF DESCRIPTION OF THE DRAWINGS

FIG. 7 is a graph showing a relationship between the solution heat treatment temperature for a die-casting aluminum alloy used in the first embodiment of the present invention and the tensile strength of the aluminum alloy;

DESCRIPTION OF REFERENCE NUMERALS

1b . . . Shank
2 . . . Holder
8 . . . Steel Ball
10 . . . Electrode

BEST MODE FOR CARRYING OUT THE INVENTION

The method of manufacturing a ball joint according to the present invention will now be described in detail with reference to the accompanying drawings.

First Embodiment

Figure 1:
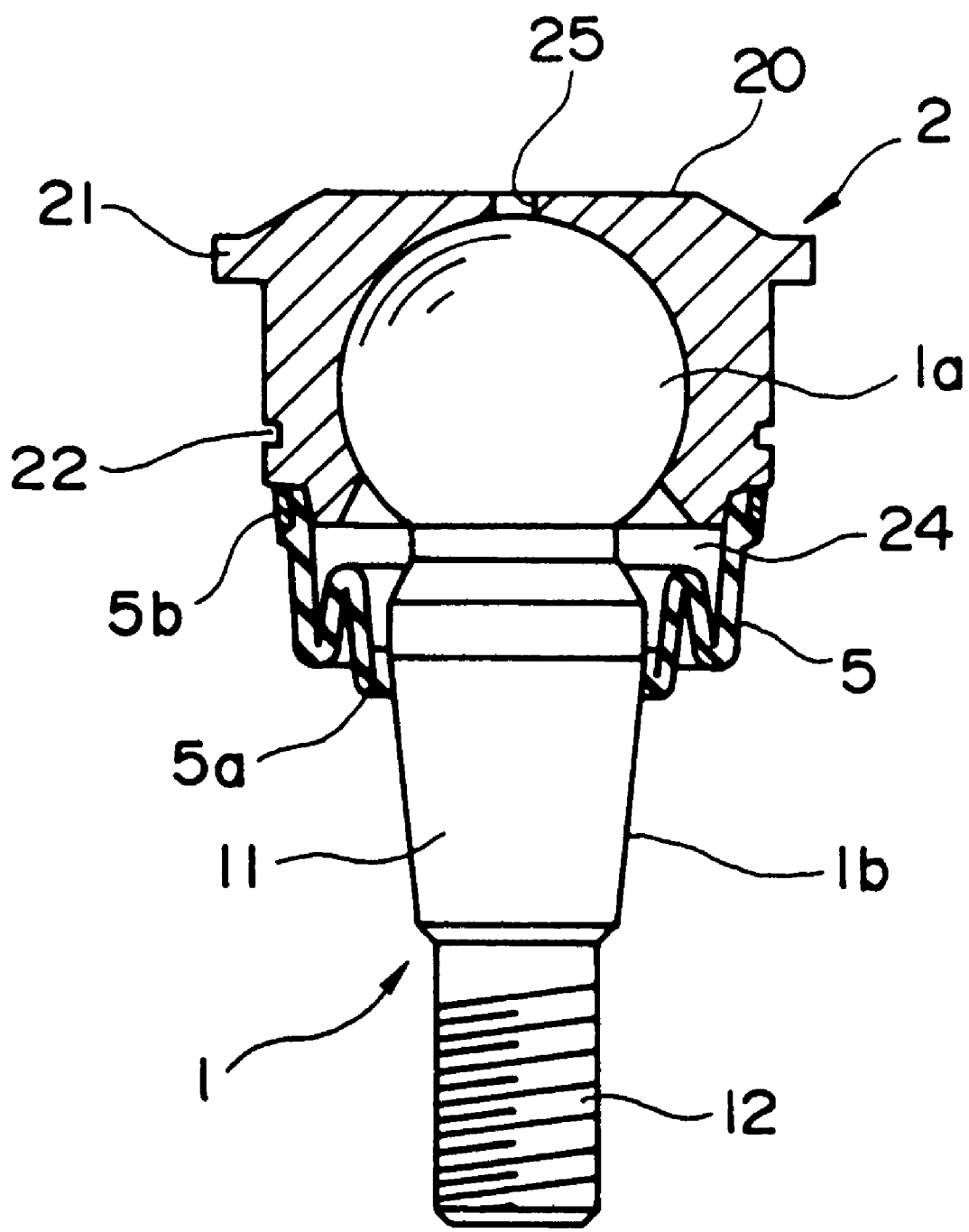
FIG. 1 is a sectional view of a first embodiment of a ball joint to be manufactured by a method of the present invention.
Figure 2:
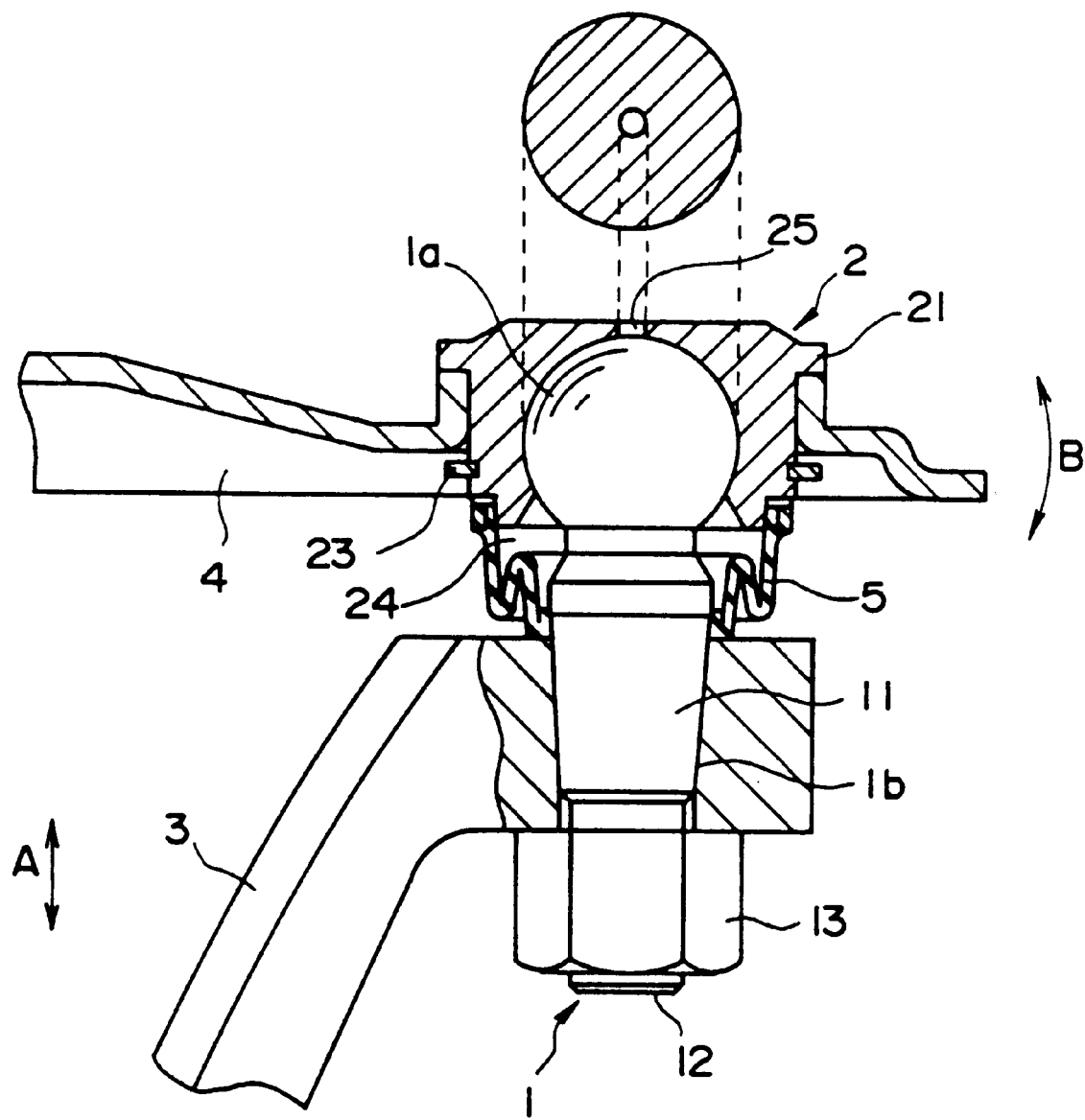
FIG. 2 is a sectional view of an example of use of the ball joint according to the first embodiment of the invention.

FIG. 1 is a first embodiment of a ball joint manufactured by the method of the present invention. This ball joint comprises a ball-shank 1 having a ball portion 1a and a substantially cylindrical holder 2 engaging the outer periphery of the ball portion 1a of the ball-shank 1 and operating such that by the sliding contact of the ball portion 1a with the holder 2, the holder 2 is coupled to the ball-shank 1 so as to freely oscillate or rotate. Further, FIG. 2 shows an example of use of the ball joint formed such that a push arm 3 capable of moving forward and rearward along an arrow A is held engaged with the ball-shank 1 while a swing arm 4 capable of oscillating along an arrow B is held engaged with the holder 2.

The ball-shank 1 is formed by welding a rod-shaped shank 1b to a steel ball having a high degree of sphericity forming itself the ball portion 1a. The shank 1b is made to have a tapered fitting portion 11 with which the push arm 3 makes a fit and the top end of the portion 11 forms itself a male screw 12. Consequently, the push arm 3 is fixed to the tapered fitting portion 11 by fitting a nut 13 about the male screw 12.

On the other hand, the holder 2 is formed by die-casting (to be described later) so as to substantially cover the ball portion 1a leaving the connected portion of the shank 1b and the ball portion 1a as it is. The holder 2 has a flat portion 20 at a position opposite the shank 1b which serves as a contact surface for an electrode at the time of projection-welding the shank 1b to be described later. Further, the holder 2 is provided on the outer periphery thereof with a collar 21 for causing the holder 2 to engage the swing arm 4 and at a position spaced a little from the collar 21 there is formed an annular groove 22 so that by fitting a stop ring 23 into the annular groove 22, the swing arm 4 is fixed to the holder 2.

Further, between the outer peripheral edge of the holder 2 and the shank 1b of the ball-shank 1 there is fixed a sealing member 5 so that a lubricant pocket 24 for receiving a lubricant such as grease to be supplied into a gap between the ball portion 1a and the holder 2 is formed and the entry of dust or waste from the connected portion of the ball portion 1a and the shank 1b into the gap is prevented. In this case, one end 5a of the shank 1b lying adjacent the shank 1b adheres closely to the shank 1b due to its elasticity while the other end 5b thereof lying adjacent the holder 2 is sandwiched between the stop ring and the outer periphery of the holder 2 so as not to be separated from the holder 2 by a swinging or rotating motion of the ball-shank 1.

It should be noted that the holder 2 according to the instant embodiment has a lubrication port 25 at the center thereof but when it is considered that the gap between the holder 2 and the ball portion 1a can be sufficiently lubricated by the lubricant received within the lubricant pocket 24, the provision of the lubrication port 25 can be disregarded.

Next, a method of manufacturing the ball joint according to the instant embodiment will be described concretely.

First, as a first step, the holder 2 is die-cast by using an aluminum alloy. The composition of an aluminum alloy used by the present inventors as a test material is shown in the following table 1.

TABLE 1

| Chemical components (percent by weight) | | | | | | |
|---|---|---|---|---|---|---|
| Zn | Si | Cu | Mg | Mn | Fe | Al |
| 15 | 8.0 | 1.0 | 0.3 | 0.3 | 0.5 | rest |

Figure 3:
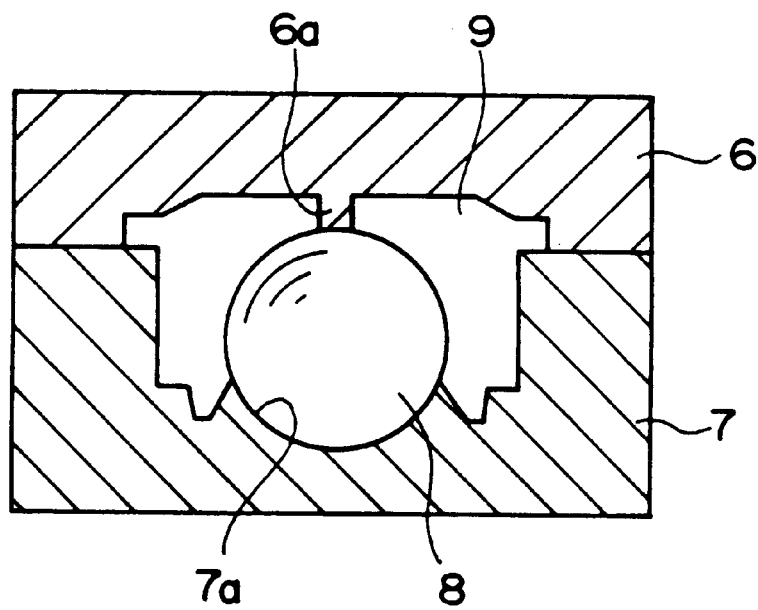
FIG. 3 is a diagram showing a casting process for a holder according to the first embodiment of the invention.

In the case of such die-casting, a steel ball 8 forming the ball portion 1a of the ball-shank 1 is inserted, as a core, into a pair of vertically separated dies 6 and 7 as shown in FIG. 3 and in this condition a molten metal is poured under pressure into a cavity 9 between the dies 6 and 7. In this case, the inserted steel ball 8 is determined of its position by a support seat 7a formed inside the die 7 and is held fixed to the support seat 7a by means of a stop rod 6a projecting from the die 6.

It should be noted in this connection that if the steel ball 8 could be fixed securely to the support seat 7a of the mold 7 by a magnetic suction force or the suction force of a vacuum apparatus, the stop rod 6a of the die 6 could be dispensed with.

Figure 4:
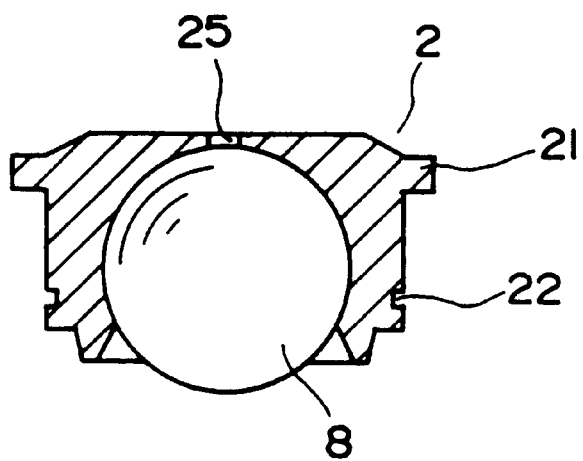
FIG. 4 is a sectional view of a holder cast by the casting process shown in FIG. 3.

With the above arrangement, the holder 2 covering the steel ball 8 with the alloy is cast leaving only the portion thereof corresponding to the support seat 7a exposed from the holder 2 as shown in FIG. 4. Further, in the instant embodiment, the holder 2 is die-cast while stopping the steel ball 8 by the stop rod 6a so that a small hole is formed even at the portion of the holder 2 that corresponds to the stop rod 6a and this hole can be utilized as the above-described lubrication port 25. It should be noted that although the collar 21 of the holder 2 is formed by die-casting, the annular groove 22 is formed by machining after the die-casting.

Next, in a second step, the holder 2 die-cast by the previous step is heated to subject the aluminum alloy forming the holder 2 to a solution heat treatment. To be more concrete, the holder 2 covering the steel ball 8 is put into a vacuum furnace and after heating it to a solution heat treatment temperature in an oxygen-free environment, the holder 2 is taken out so as to be rapidly cooled. It was found as a result of an experiment that the solution heat treatment temperature for the aluminum alloy shown in the table 1 was in the order of 360–450° C., and the heating time was about two hours.

Figure 5:
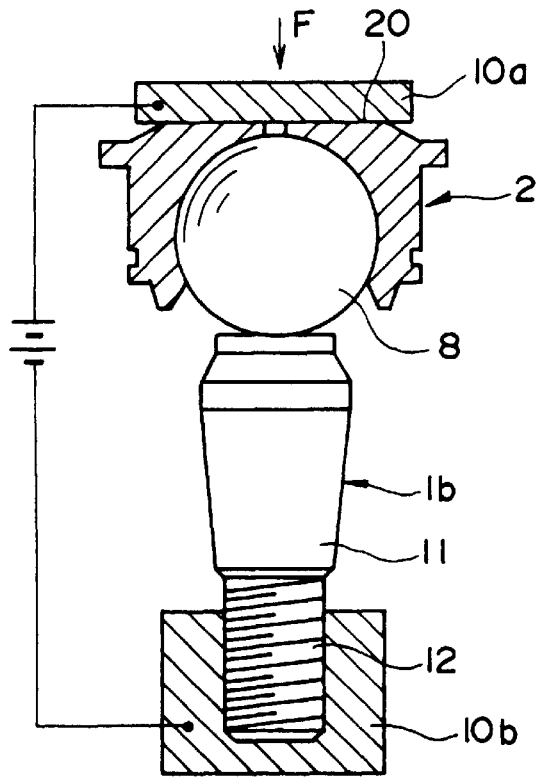
FIG. 5 is a diagram showing a welding process for welding a shank to a steel ball cast into a holder.

After the above-described step, in a third step, the shank 1b is welded to the steel ball 8 covered by the holder 2 subjected to the solution heat treatment. For such welding, a projection welding method is used in such a manner that as shown in FIG. 5, one end surface of the shank 1b is brought into pressure contact with the spherical surface of the steel ball 8 exposed from the holder 2 by the application of a predetermined force F, the electrodes 10a and 10b are brought into contact with the holder 2 and the shank 1b, respectively, and a predetermined amount of electrical current is fed between the electrodes 10a and 10b.

In this case, the electrode 10a for feeding a welding current comes into contact with the flat portion 20 of the holder 2 without directly contacting the steel ball 8 and the welding current is indirectly fed to the steel ball 8 through the holder 2. The holder 2 was held in close contact with the steel ball 8 when the holder 2 was cast in the previous step so that even when the welding current is indirectly fed to the steel ball 8 through the holder 2, the electrical resistance at the boundary of the holder 2 and the steel ball 8 is extremely small so that the holder 2 and the steel ball 8 are not welded to each other. Further, although it is assumed that the surface of the steel ball 8 has been brought under an annealed state and softened by the heating at the time of the solution heat treatment in the previous step, since the electrode 10a is not brought into direct contact with the steel ball 8, the surface of the steel ball 8 is not damaged.

Figure 6:
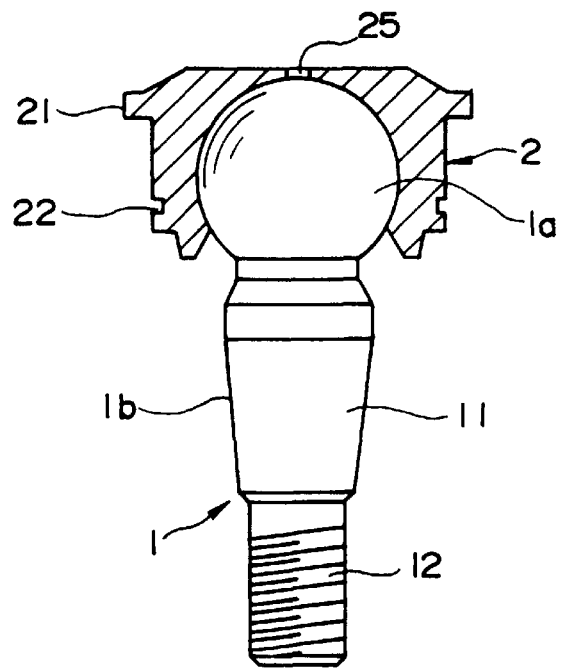
FIG. 6 is a sectional view of a ball-shank formed by welding.

Thus, when the projection welding is completed, the ball-shank 1 comprising the steel ball 8 covered by the holder 2 and the shank 1 welded thereto and the ball portion 1a thereof is in the state of being cast into the holder 2 as shown in FIG. 6.

Further, in this third step, a welding current is fed again leaving the electrode connecting state as it is and the connected portion of the steel ball 8 and the shank 1 is tempered thereby preventing the generation of a season cracking at the connected portion after welding.

Next, in a fourth step, an external force is applied to the holder 2 or the ball-shank 1 so as to form a minute gap between the holder 2 and the ball portion 1a which are still kept adhered to each other. The application of the external force to the holder 2 or the ball-shank 1 may be made by tapping the outer periphery of the holder 2 or the ball-shank 1 in the direction of axis thereof or by giving a slight impact to the ball portion 1a. Thus, by so doing, the ball portion 1a of the ball-shank 1 becomes slidable with respect to the holder 2 so that the ball-shank 1 and the holder 2 are brought under a state of being coupled to each other so as to oscillate or rotate freely.

Lastly, the sealing member 5 is fitted between the shank 1b and the outer peripheral edge of the holder 2 and a lubricant such as grease is filled into the lubrication pocket 24 formed by the sealing member 5 thereby completing a ball joint according to the instant embodiment.

The ball joint according the instant embodiment is manufactured in the above-described manner and since, according to this manufacturing method, the welding current is fed between the holder 2 and the shank 1b while bringing the electrode 10 into pressure contact with the holder 2 in the third step, it is not necessary to form an opening in the holder 2 for causing the electrode to come into direct contact with the steel ball 8 and it is possible to substantially cover the top of the ball portion 1a by the holder 2 leaving the very small lubrication port as it is.

Figure 11:
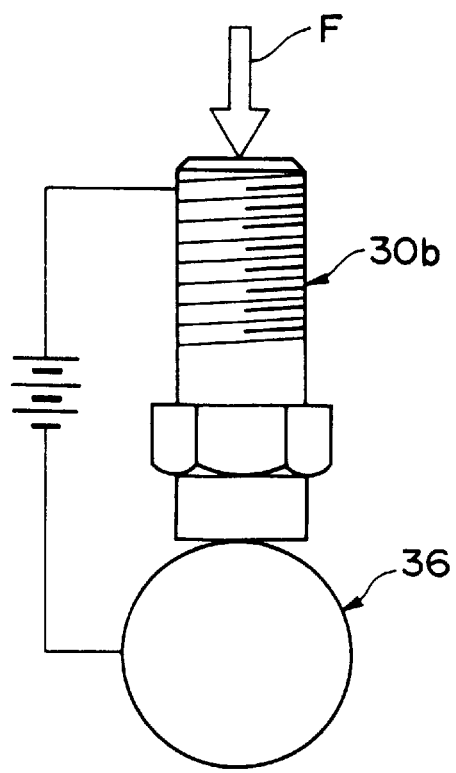
FIG. 11 is a diagram showing a welding process for welding a shank to a steel ball according to the second embodiment of the invention.

Therefore, when the area of contact between the ball portion 1a and the holder 2 is projected along the direction of axis of the ball-shank 1 as shown in FIG. 2 and the projected area of contact is compared to the area of contact in a conventional ball joint shown in FIG. 11, if the diameter of the ball portion a is assumed to be identical between the two, the area of contact in the case of the ball joint according to the instant embodiment is remarkably larger than that in the case of the conventional ball joint. Accordingly, the method of the present invention makes it possible to manufacture a ball joint having a higher degree of load bearing capacity with respect to an axial load acting along the axis of the ball-shank 1 than in the case of the conventional ball joint manufacturing method in which the opening for the passage of the electrode is always formed in the holder 2.

Further, since the electrode 10 is held in pressure contact with the flat portion 20 of the holder 2 instead of the steel ball 8, the electrode 10 is not required to be specifically formed spherical and moreover, the shape of the electrode 10 is not required to be modified according to the number of welding operations. Accordingly, the manufacturing method of the present invention makes it quite easy to perform a production control as compared to the conventional method and it becomes more suitable for automated mass production of ball joints.

At the same time, according to this manufacturing method, when the solution heat treatment for the aluminum alloy forming the holder 2 in the second step, the treatment is performed in an oxygen free environment, the surface of the steel ball 8 covered by the holder 2 does not become coarse due to oxidation and it is possible for a completed ball joint to achieve a smooth sliding motion between the holder 2 and the steel ball 8.

Figure 8:
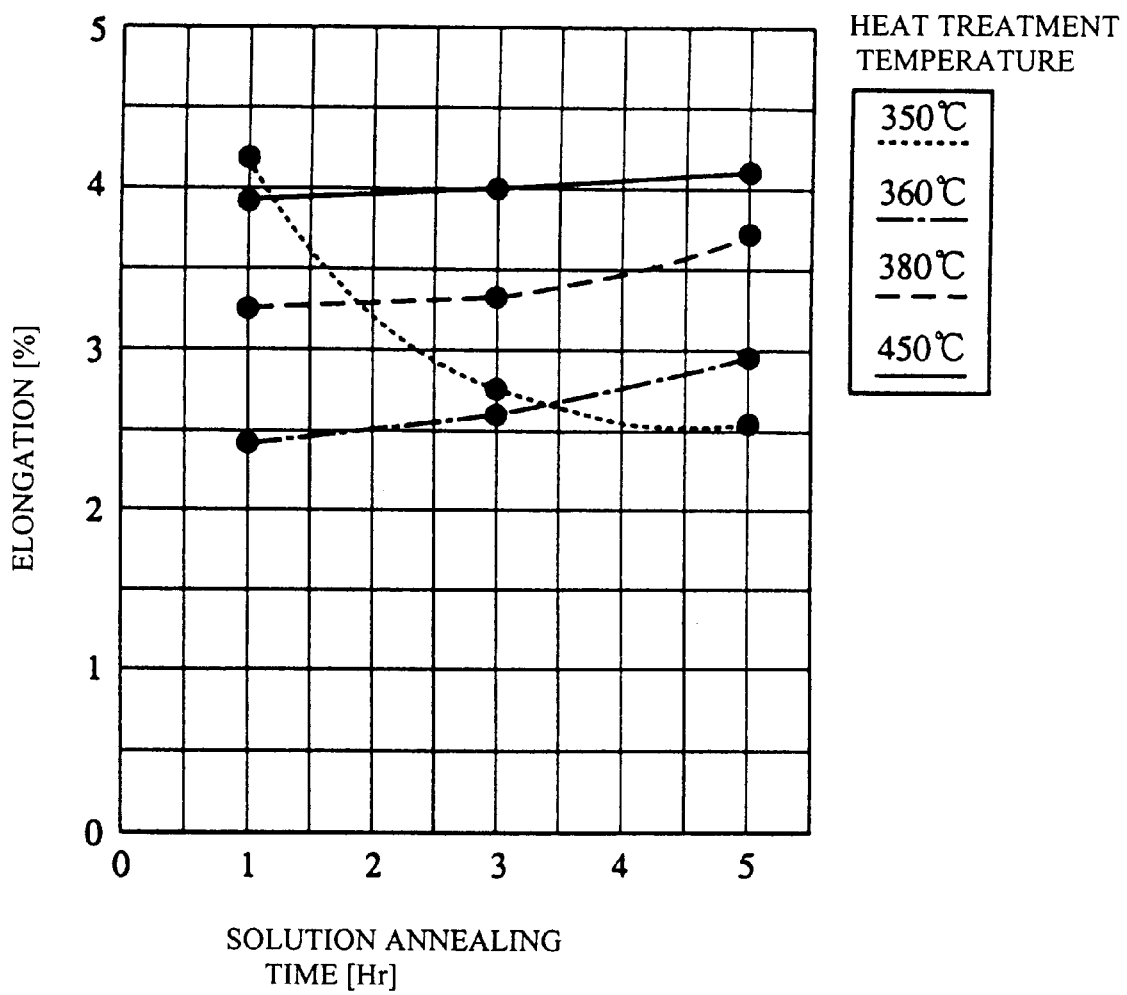
FIG. 8 is a graph showing a relationship between the solution heat treatment temperature for a die-casting aluminum alloy used in the first embodiment of the present invention and the elongation of the aluminum alloy.
Figure 9:
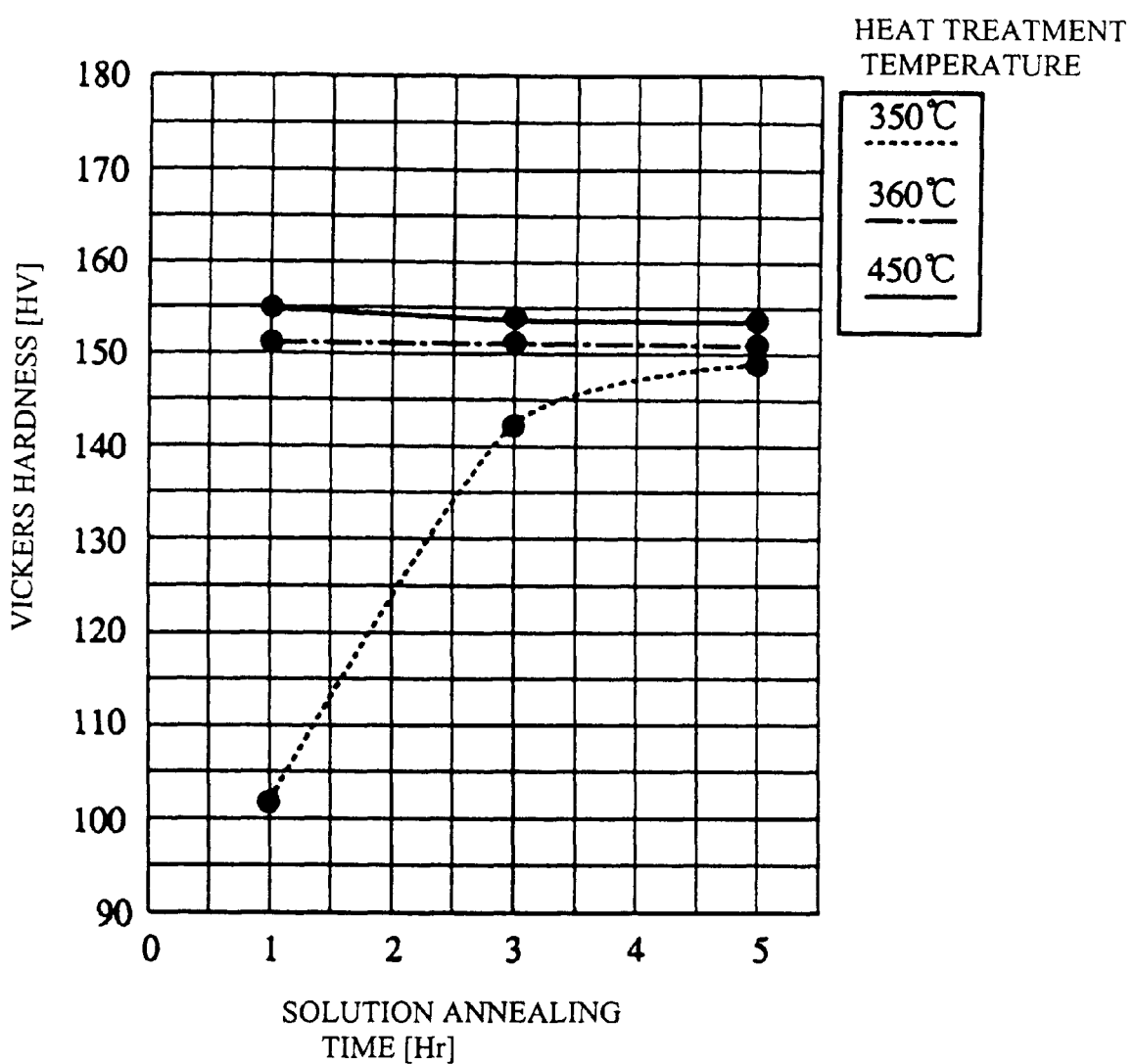
FIG. 9 is a graph showing a relationship between the solution heat treatment temperature of the die-casting aluminum alloy used in the first embodiment of the invention and the hardness of the aluminum alloy.

Further, in the case of the method of manufacturing a ball joint according to the instant embodiment, since the solution heat treatment for the holder 2 is performed in the second step, an age-hardening progresses over several hours after the completion of the ball joint and the mechanical strength of the holder 2 such as the tensile strength, elongation or impact value thereof is improved remarkably when compared to a holder that is not subjected to the solution heat treatment. The following table 2 shows concrete values of the improved results and FIGS. 7 through FIG. 9 are graphs respectively showing relationships between the solution heat treatment temperatures and the tensile strength, elongation and hardness of the holder 2.

TABLE 2

| Solution treatment | Tensile strength kg/mm$^2$ | Bearing force kg/mm$^2$ | Elongation % | Impact value kgm/cm$^2$ | Hardness Hv |
|---|---|---|---|---|---|
| No | 34 | 27 | 1.8 | 1.3 | 152 |
| Yes | 42 | 27 | 3.9 | 2.6 | 154 |

Further, the die-casting aluminum alloy used in the instant embodiment has the advantage that the solution treatment temperature for the holder 2 made of this alloy is 450° C. at the maximum and it can be performed even at a temperature of about 400° C. so that it is possible to prevent the steel ball 8 covered by the holder 2 from becoming softened in its annealed state. The following table 3 shows the variation of the surface hardness of a steel ball made of a common steel material when the steel ball (having a surface hardness of Hv=653) carbon-quenched to a depth of 0.5 mm from the surface thereof was annealed at various temperatures.

TABLE 3

| Temperature °C. | 450 | 430 | 400 |
|---|---|---|---|
| Hardness Hv | 327 | 372 | 423 |

Due to the fact that in order to prevent the steel ball 8 from being damaged due to the sliding of the steel ball with the holder 2, the steel ball is required to have a hardness Hv of about 327 although such value of hardness depends on the hardness of the holder 2, it will be understood from the results shown in the table 3 that the solution heat treatment temperature for the holder 2 must be less than 450° C. Accordingly, since the (lie-casting aluminum alloy shown in the table 1 satisfies this condition, it has been found that even when the holder 2 is subjected to a solution heat treatment, the hardness of the steel ball 8 is maintained at a value with which the function of a ball joint can be sufficiently displayed.

It should be noted that when a product formed by die-casting an aluminum alloy is heated, the mechanical strength thereof tends to lower due to the generation of blisters so that it is general not to subject such product to a solution heat treatment. However, the solution heat treatment temperature for the die-casting aluminum alloy used in the instant embodiment is in the order of 360–450° C. which is lower than that for the general aluminum alloys prescribed in the Japanese Industrial Standards(JIS) so that the mechanical strength of the alloy is little affected by the generation of blisters and even if the alloy is subjected to a solution heat treatment, the mechanical strength of the holder 2 can be remarkably improved.

Second Embodiment

Figure 10:
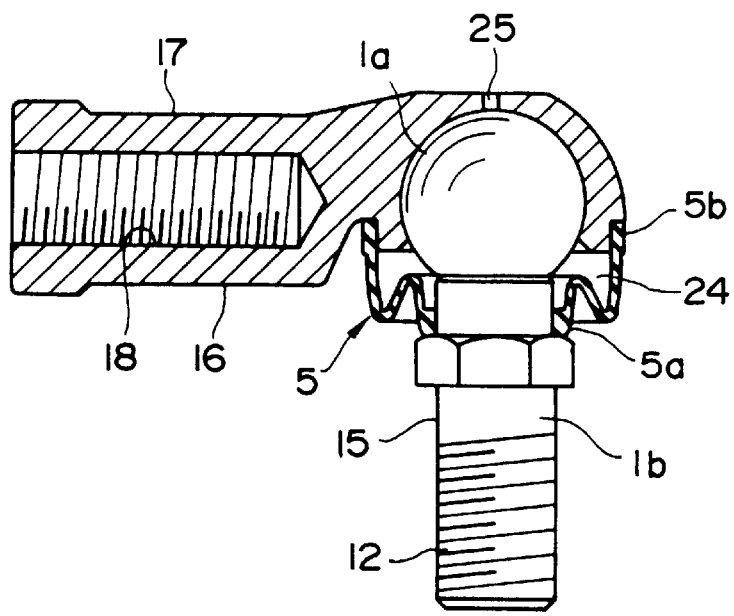
FIG. 10 is a sectional view of a ball joint according to a second embodiment of the invention.

FIG. 10 shows a second embodiment of a ball joint manufactured by the method of the present invention wherein an example of another ball joint which can be manufactured by the same method as in the case of the first embodiment is given. In this ball joint, the shape of a ball-shank 15 is quite the same as that of the first embodiment but a holder 16 is provided with an arm 17 which functions in the same manner as the above-described swing arm 4 and which is provided with a female screw 18. It should be noted that since the remaining structural parts are the same as those of the first embodiment, they are designated by the same reference numerals, respectively, in the drawings while omitting a detailed description thereof.

The ball joint according to this second embodiment may also be manufactured in such a manner, instead of the method according to the first embodiment, that a ball-shank 1 is first formed and then the holder 16 is die-cast.

That is, as shown in FIG. 11, one end surface of the shank 1b is brought into pressure contact with the spherical surface of the ball portion 1a by the application of a predetermined force F while a predetermined amount of welding current is fed between the two and then the ball portion 1a and the shank 1b are projection-welded to each other to thereby form the ball-shank 1.

Figure 12:
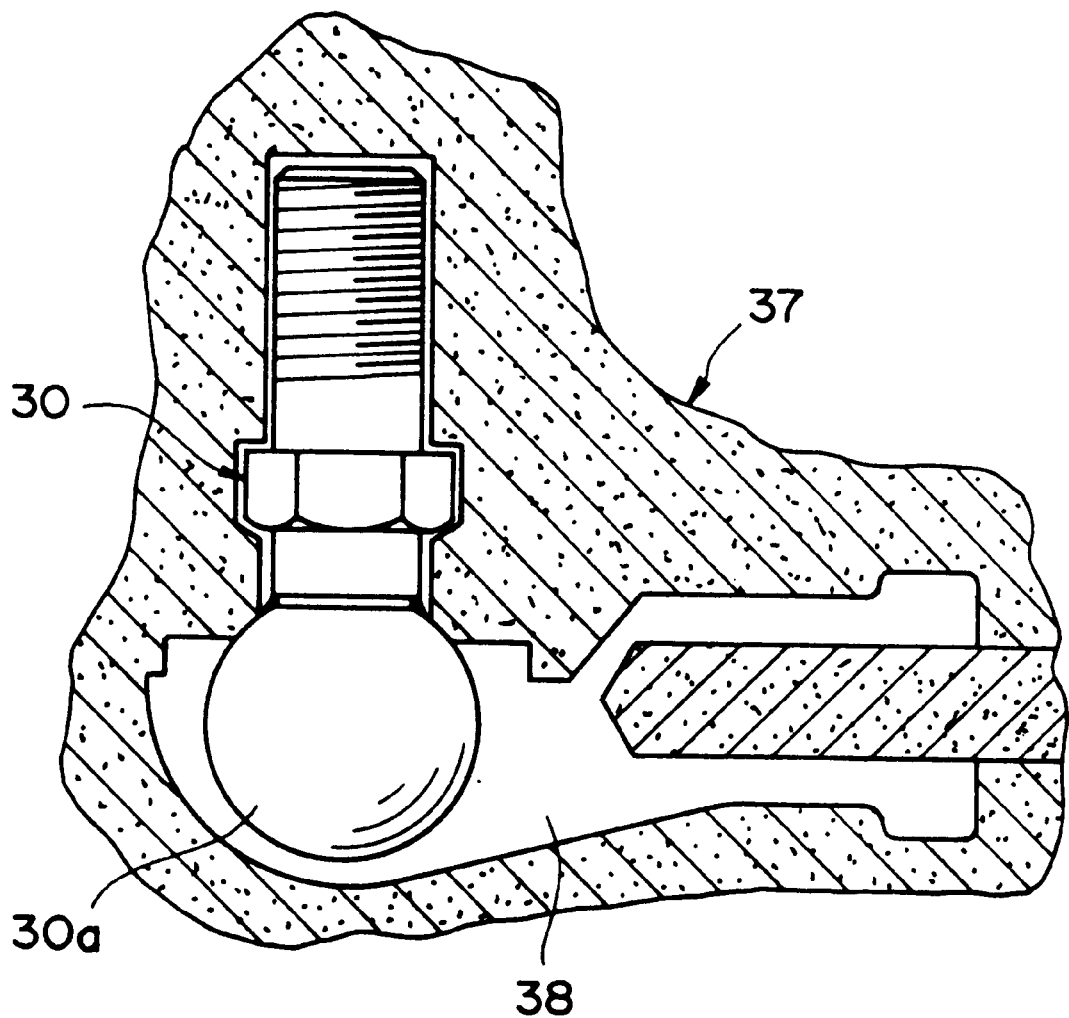
FIG. 12 is a diagram showing a casting process for a holder according to the second embodiment of the invention.

Next, the holder 16 is die-cast using the ball portion 1a of the ball-shank 1 thus formed as a core. In the case of performing such die-casting, the ball-shank 1 formed by the previous step is fixed within a casting mold 37, the ball portion 1a of the ball-shank 1 is inserted into a cavity 38 of the mold 37 and a molten metal of the same die-casting aluminum alloy as in the case of the first embodiment is poured under pressure into the cavity 38 whereby the holder 16 covering the ball portion 1a of the ball-shank 1 with the aluminum alloy is completed as shown in FIG. 12.

Then, when the ball-shank 1 and the holder 16 have been coupled to each other, the holder 16 is subjected to a solution heat treatment by using a vacuum furnace and under the same conditions as in the first embodiment and then an external force is applied to the ball-shank 1 or the holder 16 to thereby form a minute gap between the two which are in close contact with each other. Consequently, the ball portion 1a of the ball-shank 1 comes into sliding contact with the holder 16 and by fitting the sealing member 5 between the ball-shank 1 and the holder 16 thereafter, a ball joint according to this embodiment is completed.

Due to the fact that also in the case of the ball joint of the second embodiment manufactured in the above-described manner, the holder 16 formed by die-casting the aluminum alloy is subjected a solution heat treatment, the mechanical strength of the holder 16 improves remarkably due to an age hardening taking place after such solution heat treatment. Further, since the solution heat treatment is performed in an oxygen-free environment, the surface of the ball portion 1a covered by the holder 16 does not become coarse by oxidation and further, since the solution heat treatment temperature is controlled to less than 450° C., the softening of the surface of the ball portion 1a of the ball-shank 1 can be prevented. That is, as in the case of the method according to the first embodiment, a ball joint having an excellent mechanical strength and in which the ball portion 1a of the ball-shank 1 and the holder 16 come into smooth sliding contact with each other can also be manufactured by the ball joint manufacturing method according to this second embodiment.

Third Embodiment

Figure 13:
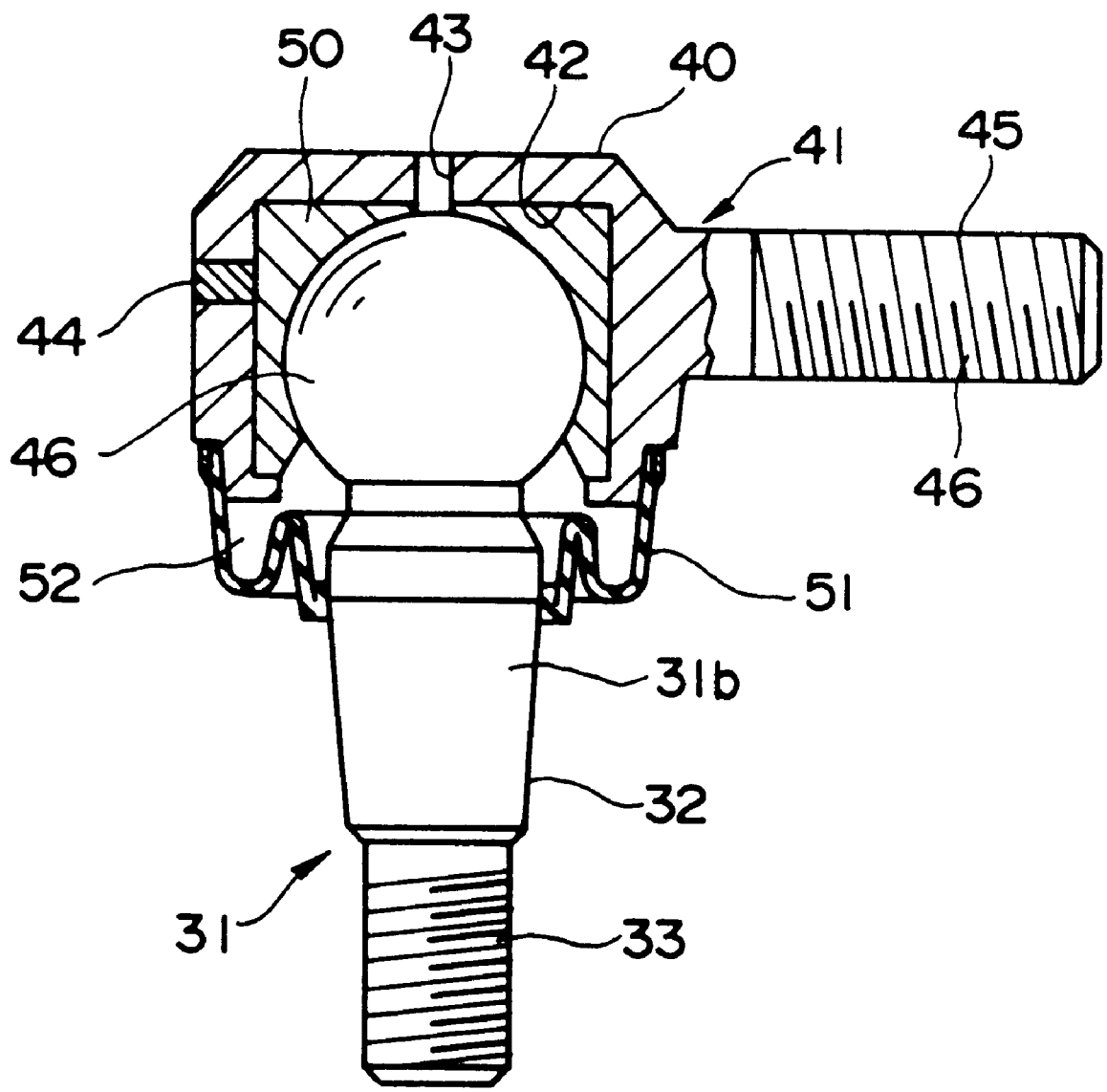
FIG. 13 is a diagram of a ball joint according to a third embodiment to be manufactured by the method of the invention.

FIG. 13 shows a third embodiment of a ball joint to be manufactured by the method of the present invention. The ball joint according to this embodiment is formed such that a ball portion 31a of a ball-shank 31 and a holder 41 are coupled to each other through a bearing bush 50 so as to oscillate or rotate freely with the ball portion 31a being cast into the holder 41 by the casting of the bearing bush 50.

As in the case of the first embodiment, the ball-shank 31 is formed by welding a rod-shaped shank 31b to a steel ball having a high degree of sphericity. The shank 31b has a tapered fitting portion 32 and a male screw 33.

At the same time, the holder 41 has a concave ball receiving portion 42 having a diameter slightly larger than the ball portion 31a and the bearing bush 50 is cast into the ball receiving portion 42 by casting to be described later. The holder 41 has a flat portion 40 at a position opposite the shank 31b which is utilized as an electrode contact surface at the time of projection-welding the shank 31b. Further, at the center of the holder 41 there is formed a lubrication port 43 while a point on the outer periphery thereof there is formed a through hole 44 which serves as a runner at the time of casting the above-described bearing bush 50. Further, the holder 41 is provided with a projecting connecting portion 45 having a male screw 46.

Further, between the shank 31a and the outer periphery of the holder 41 there is fitted a sealing member 51 to thereby provide a lubricant pocket 52.

The method of manufacturing a ball joint according to the third embodiment is as follows.

First, in a first step, the holder 41 provided with the ball receiving portion 42, the lubrication port 43 and the connected portion 45 is formed. The formation of the holder 41 may be carried out either by machining or by casting.

Figure 14:
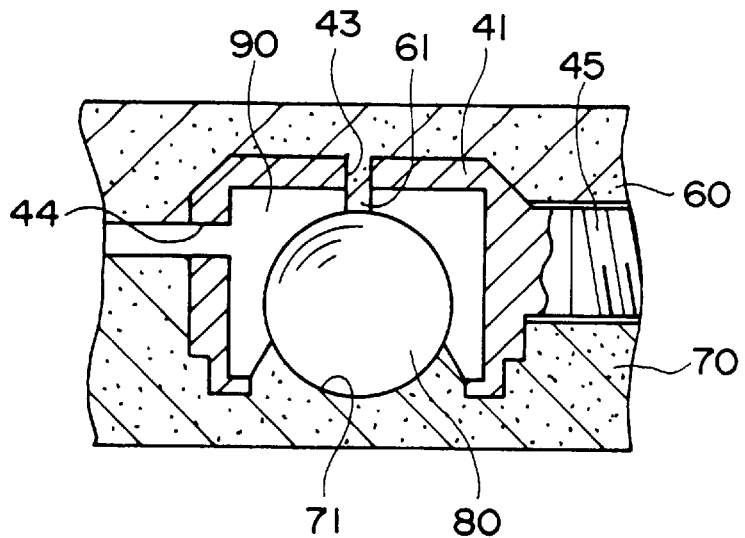
FIG. 14 is a diagram showing a casting process for forming a bearing bush according to the second embodiment of the invention.

Next, in a second step, the bearing bush is die-cast by using a zinc alloy or an aluminum alloy. For such casting, the holder 41 and a steel ball 80 forming the ball portion 31a of the ball-shank 31 are inserted, as a core, into a pair of vertically separated dies 60 and 70 and a molten metal is poured under pressure into a cavity formed between the ball receiving portion 42 of the holder 41 and the steel ball 80 as shown in FIG. 14. In this case, the inserted steel ball 80 is retained at a predetermined position within the ball receiving portion 42 of the holder 41 by means of a support seat 71 formed with the die 70 while it is held fixed to the support seat 71 by means of a stop rod 61 of the die 60 passing through the lubrication port 43 of the holder 41.

Consequently, the bearing bush 50 covering the steel ball 80 is cast with the holder 41 serving as a molding form and the steel ball 80 is exposed from the bearing bush 50 and the holder 41 only at a position corresponding to the support seat 71.

Figure 15:
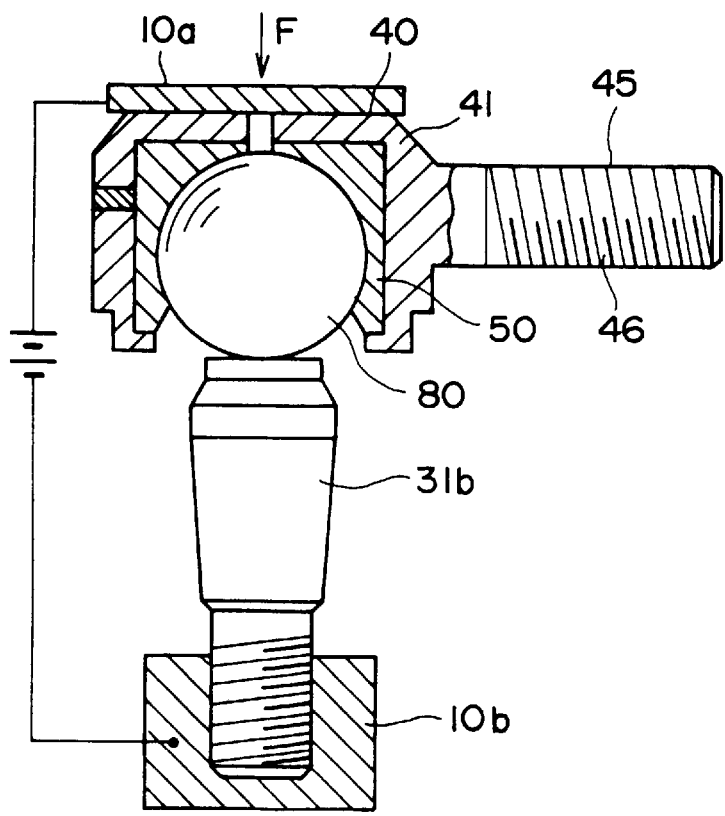
FIG. 15 is a diagram showing a welding process for welding a steel ball cast into the holder and the bearing bush to a shank.
Figure 16:
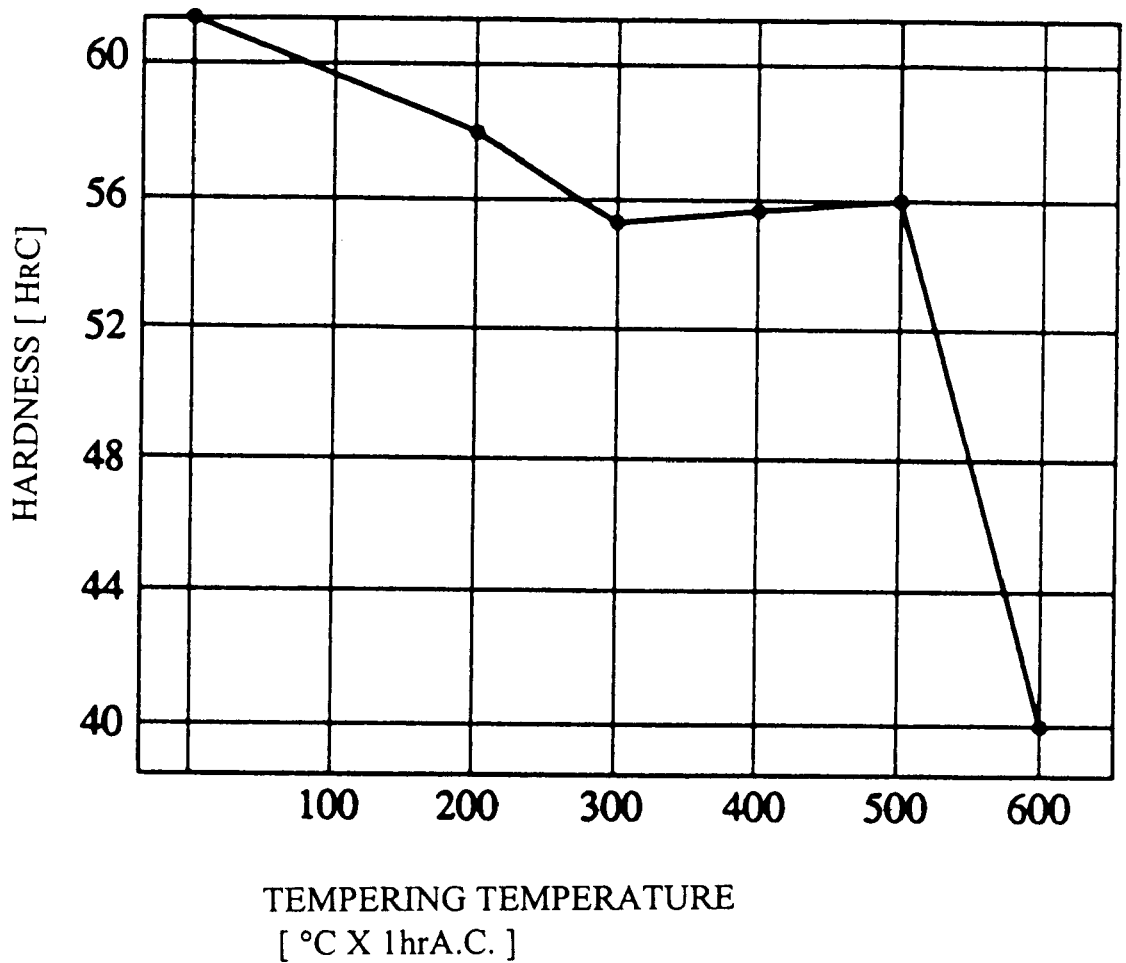
FIG. 16 is a graph showing a relationship between the hardness of a stainless steel and a tempering temperature for the stainless steel.
Figure 17A:
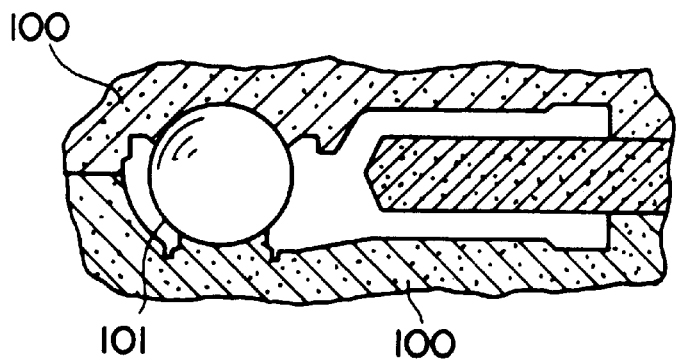
FIG. 17 is a flow chart illustrating a conventional ball joint manufacturing method.
Figure 17B:
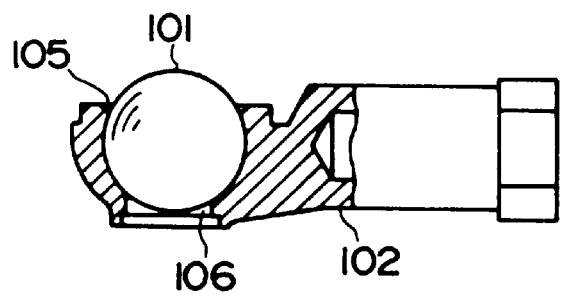
Figure 17C:
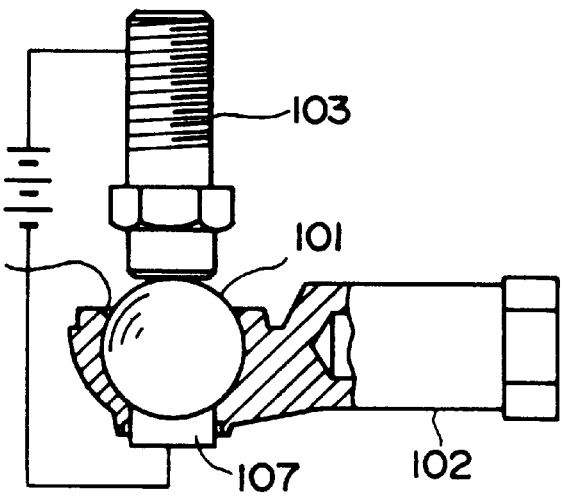
Figure 17D:
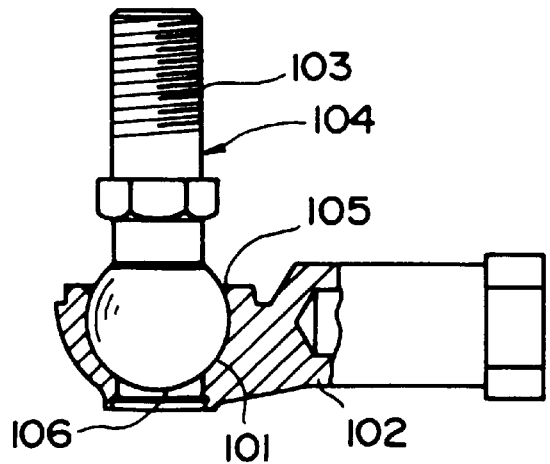
Figure 18:
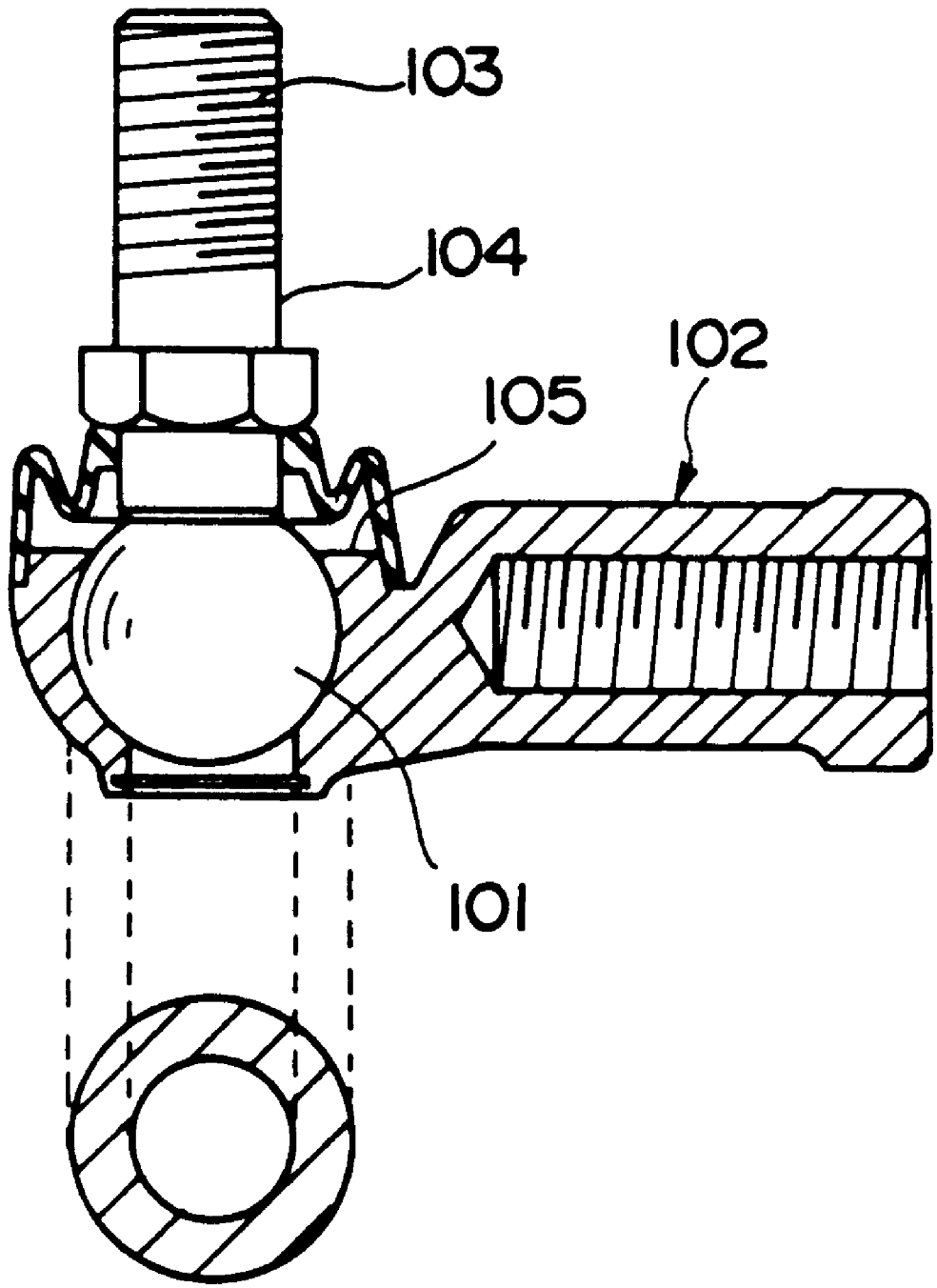
FIG. 18 is a sectional view of a ball joint manufactured by the conventional ball joint manufacturing method.

Next, in a third step, the shank 31b is welded to the steel ball 80 covered by the bearing bush 50 in the previous step. For such welding, the same projection welding process as in the case of the first embodiment is used and as shown in FIG. 15, one end surface of the shank 31b is brought into pressure contact with the spherical surface of the steel ball 80 exposed from the bearing bush 50 by the application of a predetermined force F to the electrode 10a and the electrodes 10a and 10b are caused to contact the holder 41 and the shank 31b, respectively, while a predetermined amount of welding current is fed between the electrodes 10a and 10b.

Also in this embodiment, the electrode 10a is held in contact with the flat portion 40 of the holder 41 without directly contacting the steel ball 80 but since the bearing bush 50 cast in the second step is in close contact with the holder 41 and the steel ball 80, even when the welding current is indirectly fed to the steel ball 80 through the holder 41 and bearing bush 50, the welding resistance at the boundary among the holder 41, the bearing bush 50 and the steel ball 80 is extremely small so that there is no such case where the bearing bush 50 is heated to be welded to the steel ball 80.

Thus, when such projection welding is completed, the ball-shank 31 comprising the steel ball 80 covered by the holder 41 through the bearing bush 50 and the shank 31b welded to the steel ball 80 is formed with the ball portion 31a of the ball-shank 31 being cast into the holder 41. It should be noted that in the third step, it is possible to anneal the welded portion of the steel ball 80 and the shank 31b by using the same method as in the case of the first embodiment. Lastly, in a fourth step, an external force is applied to the holder 41 or the shank 31 so that a minute gap is formed between the holder 41 and the ball portion 31a of the ball-shank 31 which are in close contact with each other and at the same time, the above-described sealing member 51 is fitted between the shank 31b and the outer peripheral edge of the holder 41 to thereby provide the lubricant pocket 52 into which a lubricant such as grease is filled, as in the case of the fourth step according to the first embodiment. Consequently, the ball portion 31a of the ball-shank 31 comes into sliding contact with the bearing bush 50 cast into the holder 41 so that the ball-shank 31 and the holder 41 are coupled to each other so as to freely oscillate or rotate.

Also, in the case of the manufacturing method according to this third embodiment, the welding current is fed between the holder 41 and the shank 31b while bringing the electrode 10a into pressure contact with one end surface of the holder 41 in its third step, the provision of an opening passing through the holder 41 and the bearing bush 50 so as to allow the electrode 10a to come into direct contact with the steel ball 80 is not required so that it is possible to manufacture a ball joint having a high degree of load bearing capacity, which would otherwise not be obtained, with respect to the axial load.

Further, this embodiment has the advantage that since the holder 41 is formed in advance by machining, if a material having an excellent mechanical strength suitable for the holder 41 is selected, it is sufficient for the die-casting alloy to have only an excellent bearing property and even when the aluminum alloy is used for the bearing bush 50, no solution heat treatment is necessitated.

INDUSTRIAL APPLICABILITY

As described above, according to the ball joint manufacturing method of the present invention, a shank is projection-welded to a ball cast into a holder in such a manner that an welding current is indirectly fed to the ball through the holder without the necessity of providing a hole in the holder through which an electrode is caused to contact the ball and therefore, it is possible to manufacture a ball joint having a higher degree of load bearing capacity with respect to the axial load acting on the shank than when such hole must be provided.

Further, the electrode to be used for the projection welding is caused to contact the holder instead of the ball, so that only if the holder is formed to have a flat portion in advance for allowing the electrode to contact thereto, the electrode which has hitherto been required to be formed strictly spherical will be able to be formed flat and the modification of the shape of the electrode at the time of production of a ball joint will no more be required. Consequently, according to the ball joint manufacturing method of the present invention, the production control becomes extremely easy and the mass production of ball joints by automated manufacturing steps can be promoted.

Further, according to the ball joint manufacturing method of the present invention, even when the holder of the ball joint is formed by die-casting an aluminum alloy, the holder can have a mechanical strength equal to or higher than that of the conventional holder made of a zinc aluminum alloy by subjecting the holder to a solution heat treatment thereby manufacturing a ball joint which is light in weight and excellent in mechanical strength.

Still further, according to the ball joint manufacturing method of the present invention, even when the holder covering the steel ball is subjected to a solution heat treatment, the surface of the steel ball can be prevented from becoming softened and it is possible to manufacture a ball joint which can smoothly oscillate or rotate.

What is claimed is:

1. A method of manufacturing a ball joint comprising a holder and a ball-shank which are coupled to each other so as to freely oscillate or rotate, which method comprises:

inserting a ball into a casting mold as a core;

casting a molten electro-conductive alloy into the casting die to cast the holder covering the ball leaving a portion of the ball exposed from the holder on one side of the holder;

holding the shank in pressure contact with the portion of ball exposed from the holder;

contacting electrodes into contact with the shank and with the holder at a position opposite said one side;

feeding a welding current between the electrodes to projection-weld the ball and the shank together to form the ball-shank; and applying an external force to one of the holder and the ball-shank so that a gap is formed between the ball and the holder.

2. The method of manufacturing a ball joint as claimed in claim 1, wherein the inserting of the ball into the casting mold includes clamping the ball between a support seat and a stop rod formed inside dies of the mold, said support seat covering said portion of said ball exposed, and said stop rod forming a lubrication port in said holder during said casting.

3. The method of manufacturing a ball joint as claimed in claim 1 or 2, further comprising providing said mold so that said position opposite said one side of said holder is a flat portion, said electrode being contacted with said flat portion of said holder.

4. A method of manufacturing a ball joint, said ball joint including a steel ball, a structural member connected to said steel ball forming a link mechanism, and a holder covering the ball, said holder and said ball being coupled to each other so as to oscillate or rotate freely, which method comprises:

casting an aluminum alloy is cast into casting dies in which the steel ball is inserted as a core to die-cast the holder covering the steel ball;

subjecting the holder made of the aluminum alloy to a solution heat treatment; and applying an external force is applied to one of the steel ball and the holder to form a gap between the steel ball and the holder so that the steel ball is made rotatable with respect to the holder.

5. The method of manufacturing a ball joint as claimed in claim 4, wherein the solution heat treatment temperature for said die-casting aluminum alloy as a casting material for the holder is less than 550° C.

6. The method of manufacturing a ball joint as claimed in claim 4, wherein said steel ball is made of a carbon-quenched common steel, and the solution heat treatment temperature for said die-casting aluminum alloy as a casting material for said holder is less than 450° C.

7. The method of manufacturing a ball joint as claimed in claim 6, wherein the casting material for said holder is an aluminum-zinc-silicon type die-casting aluminum and the solution heat treatment temperature for the alloy is on the order of 360 through 450° C.

8. The method of manufacturing a ball joint as claimed in claim 4, further comprising performing the solution heat treatment in an oxygen-free environment.

9. The method of manufacturing a ball joint as claimed in any one of claim 4 through claim 6, wherein said casting leaves a portion of said ball exposed from said holder on one side, said method further comprising holding said structural member in pressure contact with said steel ball at said a portion of said ball exposed from said holder, contacting electrodes with said structural member and said holder on a side of said holder opposite said one side, and feeding welding current between said electrodes so that said steel ball and said structural member are projection-welded to thereby form a ball-shank.

10. The method of manufacturing a ball joint as claimed in any one of claims 4 through claim 6, further comprising welding said structural member to said steel ball to form a ball-shank prior to said casting.

* * * * *